US011399303B2

(12) United States Patent
Bedekar et al.

(10) Patent No.: US 11,399,303 B2
(45) Date of Patent: Jul. 26, 2022

(54) CONFIGURATION OF A NEURAL NETWORK FOR A RADIO ACCESS NETWORK (RAN) NODE OF A WIRELESS NETWORK

(71) Applicant: NOKIA SOLUTIONS AND NETWORKS OY, Espoo (FI)

(72) Inventors: Anand Bedekar, Naperville, IL (US); Rajeev Agrawal, Naperville, IL (US); Hua Xu, Naperville, IL (US); Suresh Kalyanasundaram, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/310,701

(22) PCT Filed: Feb. 19, 2019

(86) PCT No.: PCT/US2019/018652
§ 371 (c)(1),
(2) Date: Aug. 18, 2021

(87) PCT Pub. No.: WO2020/171803
PCT Pub. Date: Aug. 27, 2020

(65) Prior Publication Data
US 2021/0385682 A1    Dec. 9, 2021

(51) Int. Cl.
*H04W 28/02* (2009.01)
*G06N 3/08* (2006.01)
(Continued)

(52) U.S. Cl.
CPC .......... *H04W 28/0215* (2013.01); *G06N 3/08* (2013.01); *H04W 8/24* (2013.01); *H04W 24/02* (2013.01)

(58) Field of Classification Search
CPC ... H04W 8/24; H04W 24/02; H04W 74/0833; G06N 3/08
(Continued)

(56) References Cited

U.S. PATENT DOCUMENTS 9,152,925 B2   10/2015   Nagaraj et al.
9,654,357 B2   5/2017    Fox et al.
(Continued)

FOREIGN PATENT DOCUMENTS

CN   1619980 A    5/2005
EP   0566548 A1   10/1993
EP   1524532 A1   4/2005

OTHER PUBLICATIONS

International Search Report and Written Opinion for International Application No. PCT/US2019/018652, dated Apr. 23, 2019, 13 pages.
(Continued)

*Primary Examiner* — Congvan Tran
(74) *Attorney, Agent, or Firm* — Brake Hughes Bellermann LLP

(57) ABSTRACT

According to an example embodiment, a method may include receiving, by a controller from a radio access network (RAN) node within a wireless network, at least one of a neural network support information, and a measurement information that includes one or more measurements by the radio access network node or one or more measurements by a wireless device that is in communication with the radio access network node; determining, by the controller based on the at least one of the neural network support information and the measurement information, a configuration of a neural network for the radio access network node; an sending, by the controller to the radio access network node, neural network configuration information that indicates the
(Continued)

configuration of the neural network for the radio access network node.

17 Claims, 7 Drawing Sheets

(51) Int. Cl.
    *H04W 8/24*     (2009.01)
    *H04W 24/02*     (2009.01)

(58) Field of Classification Search
    USPC ................................................ 370/328–329
    See application file for complete search history.

(56) References Cited

U.S. PATENT DOCUMENTS

| | | | |
|---|---|---|---|
| 9,794,155 B2 | 10/2017 | Jagannath et al. | |
| 9,848,338 B2 | 12/2017 | Randall et al. | |
| 10,039,016 B1 | 7/2018 | Larish et al. | |
| 10,341,912 B2* | 7/2019 | Cui | H04W 24/02 |
| 2008/0176554 A1 | 7/2008 | Gibbons et al. | |
| 2010/0027502 A1* | 2/2010 | Chen | H04W 72/0486 |
| | | | 370/329 |
| 2011/0151877 A1* | 6/2011 | Tafreshi | H04W 36/18 |
| | | | 455/442 |
| 2013/0143578 A1* | 6/2013 | Lekutai | H04W 36/00837 |
| | | | 455/436 |
| 2013/0344882 A1* | 12/2013 | Brisebois | H04L 41/0846 |
| | | | 455/450 |
| 2018/0097555 A1* | 4/2018 | Nammi | H04B 7/0408 |
| 2018/0205749 A1 | 7/2018 | Nandha Premnath et al. | |
| 2018/0295546 A1* | 10/2018 | Crawford | H04L 67/18 |
| 2020/0045615 A1* | 2/2020 | Karimli | H04W 28/0247 |
| 2021/0306874 A1* | 9/2021 | Bedekar | H04L 1/0004 |

OTHER PUBLICATIONS

Written Opinion of the International Preliminary Examining Authority for PCT Application No. PCT/US2019/018652, dated Feb. 3, 2021, 5 pages.

International Preliminary Report on Patentability for PCT Application No. PCT/US2019/018652, dated Jul. 1, 2021, 59 pages.

Hasegawa et al., "Experimental Evaluation of Distributed Radio Resource Optimization Algorithm Based on the Neural Networks for Cognitive Wireless Cloud", 2010 IEEE 21st International Symposium on Personal, Indoor and Mobile Radio Communications Workshops, Sep. 26-30, 2010, 6 pages.

Office Action for Chinese Application No. 20 1980095265.5, dated Jan. 4, 2022, 7 pages.

* cited by examiner

CONFIGURATION OF A NEURAL NETWORK FOR A RADIO ACCESS NETWORK (RAN) NODE OF A WIRELESS NETWORK

CROSS-REFERENCE TO RELATED APPLICATIONS

This application is a national stage entry of International Application No. PCT/US2019/018652, filed Feb. 19, 2019, entitled "CONFIGURATION OF A NEURAL NETWORK FOR A RADIO ACCESS NETWORK (RAN) NODE OF A WIRELESS NETWORK" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method may include: receiving, by a controller from a radio access network (RAN) node within a wireless network, at least one of a neural network support information, and a measurement information that includes one or more measurements by the radio access network node or one or more measurements by a wireless device that is in communication with the radio access network node; determining, by the controller based on the at least one of the neural network support information and the measurement information, a configuration of a neural network for the radio access network node; an sending, by the controller to the radio access network node, neural network configuration information that indicates the configuration of the neural network for the radio access network node.

According to an example embodiment, an apparatus may include means for receiving, by a controller from a radio access network (RAN) node within a wireless network, at least one of a neural network support information, and a measurement information that includes one or more measurements by the radio access network node or one or more measurements by a wireless device that is in communication with the radio access network node; means for determining, by the controller based on the at least one of the neural network support information and the measurement information, a configuration of a neural network for the radio access network node; an means for sending, by the controller to the radio access network node, neural network configuration information that indicates the configuration of the neural network for the radio access network node.

According to an example embodiment, an apparatus may include: at least one processor; and at least one memory including computer program code; the at least one memory and the computer program code configured to, with the at least one processor, cause the apparatus at least to: receive, by a controller from a radio access network (RAN) node within a wireless network, at least one of a neural network support information, and a measurement information that includes one or more measurements by the radio access network node or one or more measurements by a wireless device that is in communication with the radio access network node; determine, by the controller based on the at least one of the neural network support information and the measurement information, a configuration of a neural network for the radio access network node; an send, by the controller to the radio access network node, neural network configuration information that indicates the configuration of the neural network for the radio access network node.

According to an example embodiment, a non-transitory computer-readable storage medium comprising instructions stored thereon that, when executed by at least one processor, are configured to cause a computing system to perform a method of: receiving, by a controller from a radio access network (RAN) node within a wireless network, at least one of a neural network support information, and a measurement information that includes one or more measurements by the radio access network node or one or more measurements by a wireless device that is in communication with the radio access network node; determining, by the controller based on the at least one of the neural network support information and the measurement information, a configuration of a neural network for the radio access network node; an sending, by the controller to the radio access network node, neural network configuration information that indicates the configuration of the neural network for the radio access network node.

According to an example embodiment, a method may include: sending, by a radio access network (RAN) node within a wireless network to a controller, at least one of a neural network support information, and a measurement information that includes one or more measurements by the radio access network node or one or more measurements by a wireless device that is in communication with the radio access network node, that allows the controller to determine a neural network configuration for the radio access network node; and receiving, by the radio access network node from the controller, a neural network configuration information that indicates a configuration of a neural network for the radio access network node.

According to an example embodiment, an apparatus may include means for sending, by a radio access network (RAN) node within a wireless network to a controller, at least one of a neural network support information, and a measurement information that includes one or more measurements by the radio access network node or one or more measurements by a wireless device that is in communication with the radio access network node, that allows the controller to determine a neural network configuration for the radio access network node; and means for receiving, by the radio access network node from the controller, a neural network configuration information that indicates a configuration of a neural network for the radio access network node.

According to an example embodiment, an apparatus may include: at least one processor; and at least one memory including computer program code; the at least one memory and the computer program code configured to, with the at least one processor, cause the apparatus at least to: send, by a radio access network (RAN) node within a wireless network to a controller, at least one of a neural network support information, and a measurement information that includes one or more measurements by the radio access network node or one or more measurements by a wireless device that is in communication with the radio access network node, that allows the controller to determine a neural network configuration for the radio access network node; and receive, by the radio access network node from the controller, a neural network configuration information that indicates a configuration of a neural network for the radio access network node.

According to an example embodiment, a non-transitory computer-readable storage medium comprising instructions stored thereon that, when executed by at least one processor, are configured to cause a computing system to perform a method of: sending, by a radio access network (RAN) node within a wireless network to a controller, at least one of a neural network support information, and a measurement information that includes one or more measurements by the radio access network node or one or more measurements by a wireless device that is in communication with the radio access network node, that allows the controller to determine a neural network configuration for the radio access network node; and receiving, by the radio access network node from the controller, a neural network configuration information that indicates a configuration of a neural network for the radio access network node.

The details of one or more examples of embodiments are set forth in the accompanying drawings and the description below. Other features will be apparent from the description and drawings, and from the claims.

DETAILED DESCRIPTION

Figure 1:
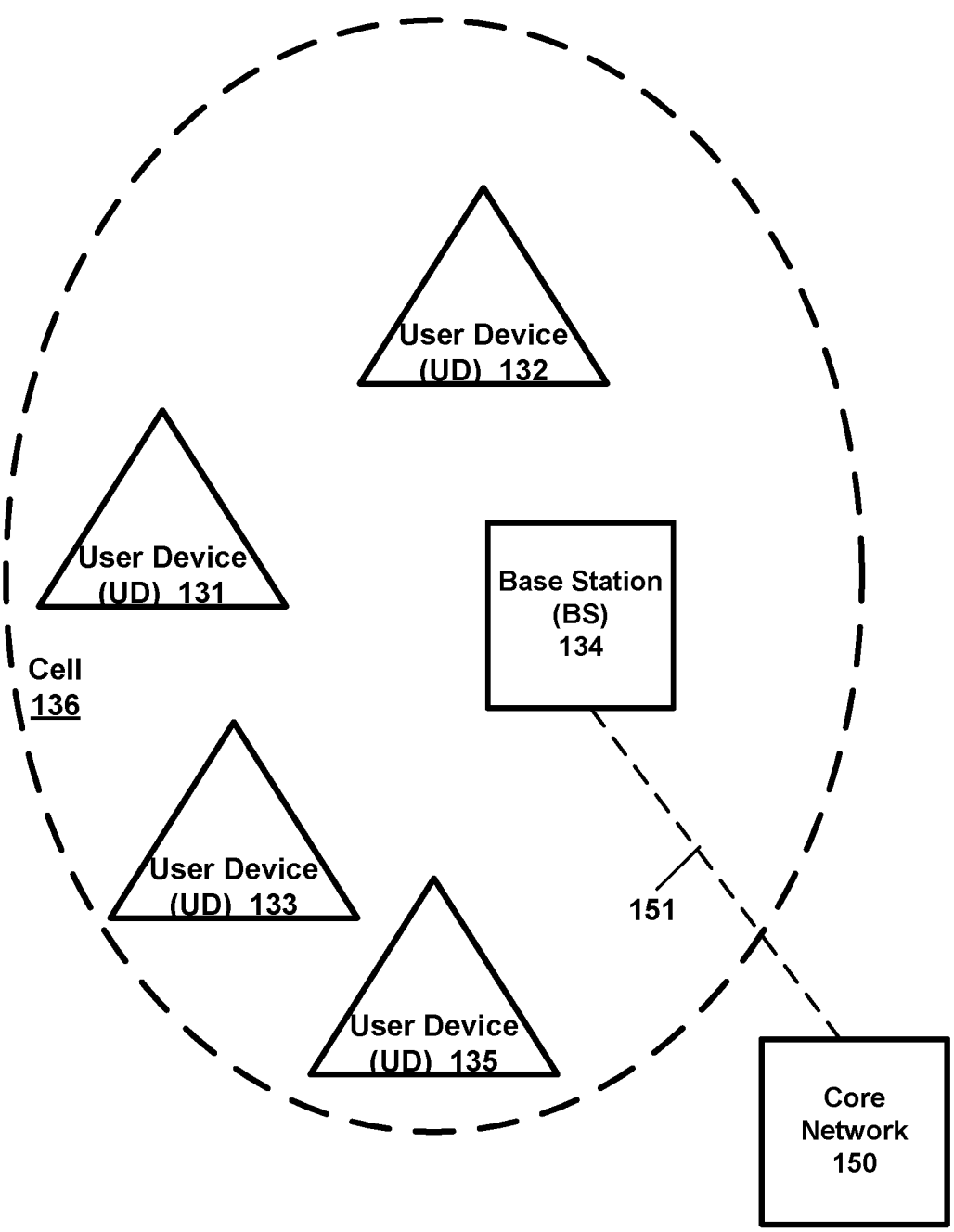
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A RAN node may be or may include, e.g., a base station (BS), an access point (AP), a gNB, an eNB, or portion thereof (such as a centralized unit (CU) and/or a distributed unit (DU) in the case of a split BS or split gNB).

According to an illustrative example, a radio access network (RAN) is part of a mobile telecommunication system. A RAN may include one or more RAN nodes that implement a radio access technology, e.g., to allow one or more UEs to have access to a network or core network. Thus, for example, the RAN (RAN nodes) may reside between one or more user devices or UEs (or mobile terminals) and a core network. According to an example embodiment, each RAN node (e.g., BS, eNB, gNB, CU/DU, . . . ) may provide one or more wireless communication services for one or more UEs or user devices, e.g., to allow the UEs to have wireless access to a network, via the RAN node. Each RAN node may perform or provide wireless communication services, e.g., such as allowing UEs or user devices to establish a wireless connection to the RAN node, and sending data to and/or receiving data from one or more of the UEs. For example, after establishing a connection to a UE, a RAN node may forward data to the UE that is received from a network or the core network, and/or forward data received from the UE to the network or core network. RAN nodes may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node may perform.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

According to an example embodiment, a RAN node may use or employ an artificial intelligence (AI) neural network (which may be referred to as a neural network, a neural network model, an AI neural network model, an AI model, a machine learning model or algorithm, or other term) to perform one or more RAN functions. According to an example embodiment, neural networks may be or may include computational models used in machine learning made up of nodes organized in layers. The nodes are also referred to as artificial neurons, or simply neurons, and perform a function on provided input to produce some output value. A neural network requires a training period to learn the parameters, i.e., weights, used to map the input to a desired output. The mapping occurs via the function. Thus, the weights are weights for the mapping function of the neural network. Each AI model or neural network may be trained for a specific task.

To provide the output given the input, the neural network must be trained, which may involve learning the proper value for a large number of parameters for the mapping function. The parameters are also commonly referred to as weights as they are used to weight terms in the mapping function. This training may be an iterative process, with the values of the weights being tweaked over thousands of rounds of training until arriving at the optimal, or most accurate, values. In the context of neural networks, the parameters may be initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

According to an example embodiment, neural networks can be trained in either a supervised or unsupervised manner. In supervised learning, training examples are provided to the neural network or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the machine learning model learns to identify a structure or pattern in the provided input. In other words, the model identifies implicit relationships in the data. Unsupervised learning is used in many machine learning problems and typically requires a large set of unlabeled data.

According to an example embodiment, the learning or training of a neural network model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include finding specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also has to optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there is no specific way to compare model performance in most unsupervised learning methods.

According to an example embodiment, as noted above, a RAN node (e.g., BS, eNB, gNB, CU and/or DU) may use an artificial intelligence (AI) neural network (e.g., which may be referred to as a neural network, an AI model, an AI algorithm, or a machine learning model or algorithm) to perform (e.g., which may include assisting in performing) one or more RAN functions. By way of illustrative examples, neural networks may be provided within a RAN node to perform one or more RAN functions, such as for example: A neural network may be embedded or included within (e.g., provided for) the Massive MIMO (multiple input, multiple output) Scheduler of a RAN node for selecting sets of users/UEs for jointly transmitting with MU (multi-user)-MIMO; a neural network may be embedded or included within the Control Plane (CP) of a RAN node for selecting a secondary cell (Scell) to configure or activate for a user/UE based on its radio measurements or other characteristics; a neural network may be embedded or included within the user plane (UP) of a RAN node for identifying different types of data flows, such as video streaming or gaming flows of data packets; a neural network embedded or included within the physical layer for digital pre-distortion (DPD) or massive-MIMO detection/decoding. These are just a few examples of where a neural network may be used to perform or assist in performing one or more RAN node (e.g., BS, eNB, gNB) functions.

However, according to an example embodiment, at least in some cases, before a neural network can be used by a RAN node for one or more RAN functions, the neural network may first be configured, e.g., because of differences that may exist between RAN nodes and/or cells. For example, due to these differences or variations between RAN nodes and/or cells or variations in conditions at RAN nodes or a cell(s) (which may vary over time), different neural network configurations may be used for different RAN nodes. Also, a neural network configuration may be changed over time for a RAN node, e.g., as various conditions or measurements with respect to the RAN node or cell(s) change or vary over time.

According to an example embodiment, configuring a neural network (e.g., which may include selecting a type of neural network and/or setting one or more values or parameters of the neural network) for a RAN node (e.g., for one or more RAN functions) may be based on a variety of information, e.g., such as types of neural networks that may be available or supported by a RAN node, hardware and/or software that may be provided by a RAN node, and/or one or more measurements or data associated with the RAN node (e.g., RAN node load, available resources at the RAN node) or measurements related to a cell or group of cells (e.g., cell load, SINR or RSSI measurements of UEs, or other signal measurements, handover data, etc., and/or other measurements that may be measured or determined within a cell or a wireless network).

Neural networks can be of many types, e.g., such as feed forward, recurrent, convolutional, Q-learning networks, LSTM, etc. Each cell (and each UE within each cell) has widely different characteristics, e.g., such as a distance to neighbor cells, propagation characteristics (delay spread, scatter/reflection, path loss exponent, etc.), SINR (signal to interference plus noise ratio) measurements or variations, antenna channel weights, cell load conditions, etc. These may differ from user-to-user (from UE to UE), from cell-to cell, and within a cell (or group of cells) over time. Also, each RAN node may have different features or capabilities, e.g., such as different neural network capabilities (e.g., capabilities of the RAN node to support different types of neural networks), and different hardware and/or software.

Furthermore the hardware available in a given RAN node (e.g., BS, eNB, gNB, . . . ) may be very different from the hardware available at a different RAN node, leading to differences in ability to support different types or configurations of neural networks. There may be limitations on the size (number of neurons or layers) of neural networks that a particular RAN node's hardware can support, e.g., due to available processing power (e.g., number of processors/processing cores and/or clock speed of processors or processing cores) or size (or amount) of memory at the RAN node. There may be differences in the accuracy (e.g., 8-bit integer calculations or 16-bit or 32-bit floating point calculations) supported by a particular RAN node's hardware. Also, for example, some RAN nodes may include one or more hardware accelerators that may be used to perform neural network computations. Other RAN nodes may not have any hardware accelerators, e.g., requiring such RAN nodes to time-share process the neural network computations by the processor/processor cores along with other tasks (e.g., which may reduce performance of the neural network and/or and consume processing and/or memory resources of the RAN node, and/or which may limit the use of neural networks to specific RAN functions that may require less processing power so as not to overwhelm the processing resources of that RAN node).

Also, one or more parameters may be configured with respect to a neural network. For example, the number of neurons, the weights of neurons, the number of layers, and the connectivity of the network may be configured, and e.g., may also be changed over time, e.g., as various conditions (e.g., as available resources at the RAN node) may change. As noted, the software provided at each RAN node may be different, which may provide differing levels of neural network support, and/or which may change over time, causing the neural network support at different RAN nodes to also change over time. Also, some types of information, e.g., related to cell(s) or network load, and/or other conditions or measurements may be specific to a cell or RAN node and may also change over time.

As a result, a problem may exist where determining a (e.g., a best or at least a supported) configuration of a neural network(s) for each RAN node may be a relatively complex or challenging determination, e.g., which may be based on a wide variety of information, depending on the implementation. A suitable (e.g., including determining at least a neural network configuration that is supported by the RAN node and/or which may fit a variety of information or conditions with respect to the RAN node) neural network configuration (e.g., which may include a neural network type and associated neural network parameters or settings) may be different for different RAN nodes, and/or may change over time, and e.g., may be based on one or likely more parameters or information (e.g., see above for some examples of the type of information upon which a neural network configuration may be determined or based upon). Thus, in some cases it may be challenging to select a neural network configuration (e.g., which may include selecting a neural network and determining one or more configuration parameters for the neural network) for a RAN node (or to be used for a RAN node function).

Therefore, according to an example embodiment, a method may include receiving, by a controller from a radio access network (RAN) node within a wireless network, at least one of a neural network support information, and a measurement information that includes one or more measurements by the RAN node or one or more measurements by a wireless device that is in communication with the RAN node; determining, by the controller based on the at least one of the neural network support information and the measurement information, a configuration of a neural network for the RAN node; and sending, by the controller to the RAN node, neural network configuration information that indicates the configuration of the neural network for the RAN node.

In an example embodiment, the receiving may include receiving, by the controller from the radio access network (RAN) node within the wireless network, the neural network support information; and wherein the determining may include determining, by the controller based on at least a portion of the neural network support information, the configuration of the neural network for the RAN node.

In an example embodiment, the receiving may include receiving, by the controller from the radio access network (RAN) node within the wireless network, the measurement information; and wherein the determining may include determining, by the controller based on at least a portion of the measurement information, the configuration of the neural network for the RAN node.

According to an example embodiment, the neural network support information may include at least one of: neural network capability information that indicates capabilities of the RAN node to support one or more different types of neural networks; and hardware information for the RAN node, including at least one of the following: hardware feature information that indicates one or more hardware features of the RAN node; and hardware availability information that indicates an availability of the hardware of the RAN node to support the neural network.

According to an example embodiment, the hardware feature information may include information that indicates one or more of the following for the RAN node: information describing a number and/or clock speed of processors or processor cores of the RAN node; information describing an amount of memory of the RAN node; and information describing one or more hardware accelerators of the RAN node that may be used for the neural network.

According to an example embodiment, the hardware availability information may include information that indicates one or more of the following for the RAN node: an amount or percentage of processor resources of the RAN node that is available for the neural network; an amount or percentage of processor resources of the RAN node that is used or occupied, and unavailable for the neural network; an amount or percentage of memory of the RAN node that is available for the neural network; an amount or percentage of memory of the RAN node that is used or occupied, and unavailable for the neural network; an amount or percentage of hardware accelerator resources of the RAN node that are available for the neural network, for one or more hardware accelerators of the RAN node; and an amount or percentage of hardware accelerator resources of the RAN node that are used or occupied, and unavailable for the neural network, for one or more hardware accelerators of the RAN node.

In an example embodiment, the measurement information may include one or more measurements by the RAN node or one or more measurements by a user device (UE) or other node connected to, or in communication with, the RAN node; wherein the determining includes: determining, by the controller based on the neural network support information and the measurement information, a configuration of a neural network for the RAN node.

According to an example embodiment, the determining may include: determining a neural network type that is supported by the RAN node for the RAN function; and determining one or more attributes or parameters for the neural network.

According to an example embodiment, the neural network capability information indicates capabilities of the RAN node to support one or more different types of neural networks for each of one or more RAN functions of the RAN node; and wherein the determining, by the controller based on the neural network support information, a configuration of a neural network for the RAN node includes: determining, for each of the one or more RAN functions of the RAN node, a neural network type that is supported by the RAN node for the RAN function.

The method may include sending, by the controller to the RAN node, information indicating at least one type of the hardware availability information and/or at least one type of measurement information that should be provided by the RAN node to the controller.

The method may include sending, by the controller to the RAN node, information indicating at least one of a processing or filtering that should be performed by the RAN node on the hardware availability information and/or the measurement information before the RAN node sends to the controller the hardware availability information and/or the measurement information. Also, the method may include sending, by the controller to the RAN node, information indicating a format of at least one of the hardware availability information and the measurement information to be reported or provided by the RAN node to the controller.

Likewise, according to an example embodiment (e.g., from a perspective of a RAN node), a method may include sending, by a radio access network (RAN) node within a wireless network to a controller, at least one of a neural network support information, and a measurement information that includes one or more measurements by the RAN node or one or more measurements by a wireless device that is in communication with the RAN node, that allows the controller to determine a neural network configuration for the RAN node; and receiving, by the RAN node from the controller, a neural network configuration information that indicates a configuration of a neural network for the RAN node.

Some example advantages or benefits of such a system or technique may include, for example:

1) AI techniques such as neural networks embedded in the RAN have the potential to provide significant improvement in the performance of RAN functions (e.g., throughput gain, cell coverage gain, . . . ) as well as reduction in complexity (both run-time complexity of RAN functions such as data scheduling (by the RAN node scheduler), as well as operational/automation complexity for operators).

2) The proposed solution may provide or may include components that facilitate the use of AI (neural network) techniques such as neural networks embedded in a RAN node (e.g., BS, AP, eNB, gNB, CU and/or DU).

3) Ability to use a controller that can interface with the RAN node(s).

4) Ability for controller to interact with a diverse set of RAN nodes (which may have a wide variety of features neural network support and/or conditions), and support a diverse set of neural network types.

5) Allows a configuration (e.g., which may include selecting a type of a neural network, and/or selecting or configuring one or more attributes or parameters of the neural network) of a neural network to be determined for a RAN node, e.g., where the neural network configuration may be specific or tailored to the specific features, conditions and/or measurements associated with (or for) such RAN node.

6) Ability to provide offline as well as online training and optimize the configuration/weights of the neural network to be used by the RAN node.

Figure 2:
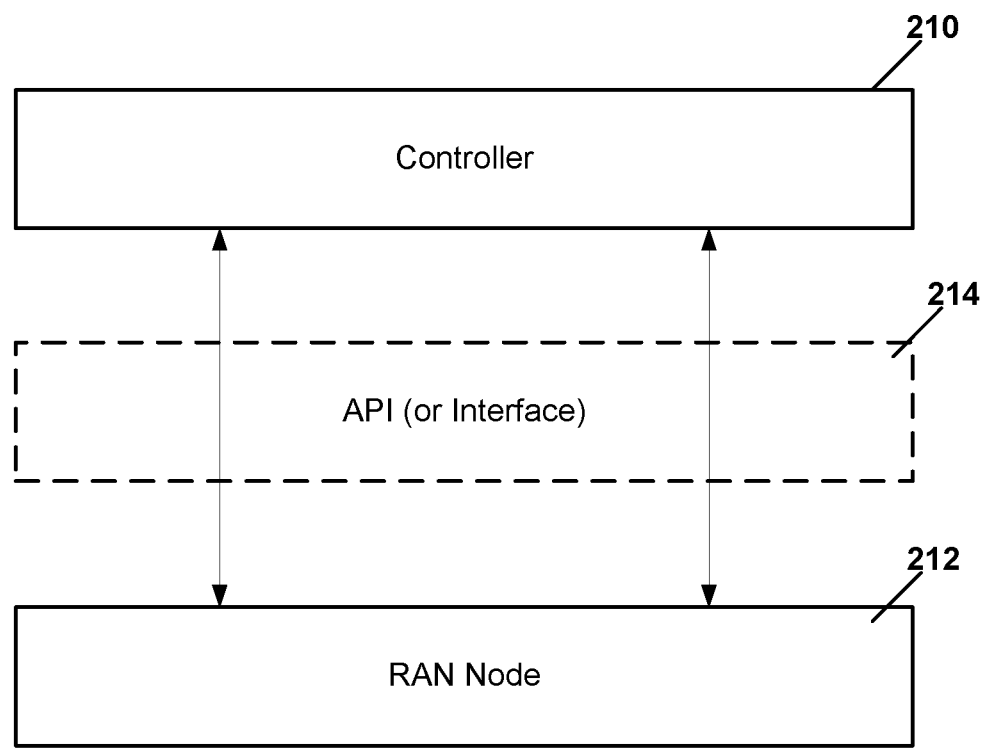
FIG. 2 is a diagram illustrating a system according to an example embodiment.

FIG. 2 is a diagram illustrating a system according to an example embodiment. As shown in FIG. 2, the system includes a controller 210, a RAN node 212, and an interface 214. The RAN node 212 may be a BS, an AP, a gNB, an eNB, a CU and/or DU (e.g., in the case of a split gNB), or other RAN node. The RAN node 212 may provide wireless communications services to one or more UEs that are within range of the RAN node 212. Although not shown, RAN node 212 may be connected or in communication with a core network, e.g., via wired or wireless connection or link. Controller 210 may perform one or more control functions with respect to one or more RAN nodes, including for RAN node 212. For example, one of the control functions that controller 210 may perform may include receiving neural network support information from the RAN node 212, determining a configuration of a neural network for the RAN node 212, and then sending or transmitting to the RAN node 212 neural network configuration information that may indicate a configuration of a neural network for the RAN node 212. The controller 210 may be located at a BS or RAN node, at a node of the core network, in the cloud, or other node within the wireless network. The API may provide a set of commands or functions (application programming interface, or simply interface) that allows the controller 210 and RAN node 212 to communicate, e.g., with respect to allow the controller 210 to receive from the RAN node 212 information (such as neural network support information) and to allow the controller to send or provide neural network configuration information that indicates a configuration of a neural network for the RAN node 212.

According to an example embodiment, neural network support information may include at least one of neural network capability information that indicates capabilities of the RAN node to support one or more different types of neural networks; and hardware information for the RAN node, including at least one of the following: hardware feature information that indicates one or more hardware features of the RAN node; and hardware availability information that indicates an availability of the hardware of the RAN node to support the neural network. The hardware feature information may include information that indicates one or more of the following for the RAN node: information describing a number and/or clock speed of processors or processor cores of the RAN node; information describing an amount of memory of the RAN node; and information describing one or more hardware accelerators of the RAN node that may be used for the neural network. For example, the determining, by the controller based on the neural network support information, a configuration of a neural network for the RAN node may include determining a neural network type that is supported by the RAN node for the RAN function; and/or determining one or more attributes or parameters for the neural network.

In an example embodiment, neural network support information (e.g., including hardware capability/availability information and possibly other information) and/or measurement information may be reported by the RAN node to the controller. In some embodiments, the neural network support information, e.g., such as the types of neural networks supported by the RAN node or the list of RAN functions for which a neural network may be used or hardware capability descriptors e.g., (indicating hardware capability or availability information) etc., may be provided or sent to the controller not directly by the RAN node, but by other techniques or by (or from) other nodes. For example, a network operator, e.g., provided in or at a core network, or other node, may provide this information to the controller in the form of configuration parameters or configuration files, or via a separate management console or interface such as a network interface or command line interface.

Also, for example, the controller may also receive measurement information that includes one or more measurements by the RAN node or one or more measurements by a user device (UE) (or other node/device) connected to (or in communication with) the RAN node; wherein the controller may determine, based on the neural network support information and the measurement information, a configuration of a neural network for the RAN node. After the controller determines a neural network configuration (e.g., based on neural network support information and/or measurement information), the controller may send neural network configuration information to the RAN node that indicates the configuration (e.g., which may indicate a neural network type and/or one or more neural network parameters or settings) of the neural network for the RAN node.

According to an example embodiment, a system (e.g., see FIG. 2) may include a number of features and functions (several aspects of an example embodiment are briefly described below, including aspects A-F):

A. a RAN node 212 (eNB or gNB, or in the case of split CU/DU, either CU or DU) capable of executing a neural network as part of one or more RAN functions for one or more cells;

B. a controller 210, e.g., that supports a configuration (e.g., which may include selecting a neural network type and/or setting one or more neural network parameters or settings) of one or more neural networks that will be processed at (or embedded in or used by) the RAN node 212, and which may provide training and/or refinement of the neural network;

C. An API 214 between (and which may be used by) the RAN node 212 and the Controller 210 to communicate (e.g., to send requests and/or replies, or other communications); Controller 210 may request RAN node 212 to provide neural network support information, e.g., which may include a list of types of neural networks supported by the RAN node 212, a list of RAN functions of the RAN node 212 that can use neural networks, a list of hardware capability descriptors, etc. These are merely a few examples, and the neural network support information may include other information as well. Controller 210 may also request the RAN node 212 to provide measurement information (and may even request the format of such measurement information to be provided and/or a type of processing or pre-processing of such measurement information, such as providing a summary of some data), which may include, e.g., various types of data elements/metrics associated with a cell, or associated with the RAN node, along with mode of delivery (streaming/batch-mode, periodic/event-driven, real-time/delay-tolerant, etc.). Thus, for example, the measurement information may include, e.g., signal measurements (e.g., RSSI, SINR, cell load, with respect to a cell of the RAN node, as well as an indication of an amount or portion of currently available hardware (and/or software) resources of the RAN node (e.g., amount of processor or memory resources) available at the RAN node for neural networks. As noted, for example, the controller 210 may instruct the RAN node 212 to pre-process or pre-filter various neural network support information and/or measurement information or data elements before sending them to the controller 210. For example, the controller 210 may instruct the RAN node 212 to provide an average of SINR or RSSI values, or to provide a list of the 3 highest SINR values of signals received by RAN node from different UEs, or to provide summary information of some measurements, or to provide certain measurement values that are greater than an indicated threshold, or to provide a percentage (or an amount) of memory available at the RAN node for neural network processing, etc.

D. RAN node 212 may provide to the controller 210 using the API: e.g., neural network support information, which may include for example: a list of supported types of neural networks whose execution is supported by RAN node 212; a list of RAN functions for which the RAN node 212 can execute a neural network to make decisions or perform at least a portion of the RAN function; a list of hardware capabilities descriptors describing the hardware capabilities of the RAN node for executing neural network. The RAN node 212 may provide measurement information to the controller 210, e.g., such as a list of data elements describing various conditions or metrics or measurements of the cell or users (UEs) in the cells of the RAN node 212, e.g., after RAN node 212 performs any pre-filtering or pre-processing as instructed by the controller 210.

E. Controller 210 makes a determination of a neural network configuration for the RAN node 212, e.g., taking into account or based upon the information (e.g., based on the neural network support information and/or measurement information provided by the RAN node 212) received from the RAN node 212 via the API; For each neural network to be used or configured at the RAN node 212, the controller 210 may provide to RAN node 212 an initial or updated configuration of the neural network, e.g., which may include or indicate: 1) which type of neural network to use for each supported RAN function at the RAN node 212; and/or 2) one or more neural network parameters or neural network settings, e.g., such as, a number and type of inputs, a number of type of outputs of the neural network, a number of neurons of the neural network, layers of the neural network, a connectivity graph for the neural network, weights of the neural network, activation functions of the neural network, etc. These are merely some illustrative examples.

F. Controller 210 provides to the RAN node 210, for each neural network to be configured at the RAN node 212, the determined neural network configuration (e.g., which may include a type of neural network and/or initial (or an updated) neural network parameters or settings), e.g., via the API. Also for example, subsequently, the RAN node 212 may continue to provide to Controller 210, the measurement information as requested (e.g., in a format requested, specific types of requested measurement information and/or with specific processing or pre-processing before sending the measurement information), e.g., which may include data elements or information describing updated conditions or metrics or measurements of (or with respect to) a cell and/or UEs within a cell(s) at the RAN node 212, or an indication of currently available resources (e.g., hardware resources) of the RAN node (such as an amount of processor or memory resources available for neural network processing), for example. Also, for example, subsequently, controller 210 may provide to the RAN node for one or more neural networks of the RAN node 212, at appropriate times, e.g., at times as instructed, or when measurement information and/or neural network support information of the UE changes), updated configuration of the neural networks, including possibly updated type of neural network).

Figure 3:
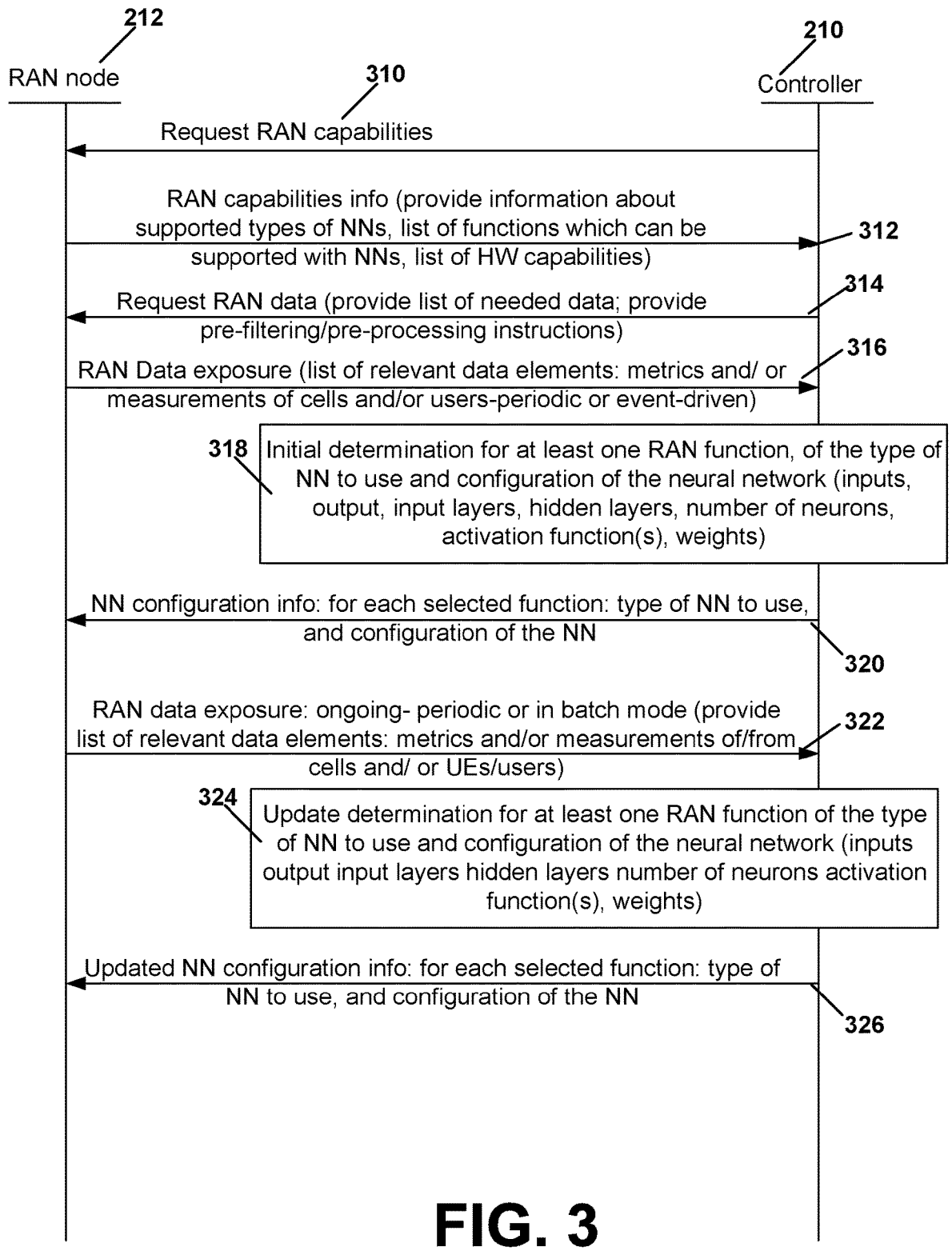
FIG. 3 is a signaling chart illustrating operation of a system according to an example embodiment.

FIG. 3 is a signaling chart illustrating operation of a system according to an example embodiment. As shown in FIG. 3, RAN node 212 is in communication with a controller 210. At 310, controller 210 sends a request for RAN capabilities to RAN node 212 (e.g., which may include a request for neural network support information). At 312, the RAN node 212 sends to controller 210, its RAN capabilities, which may include neural network support information, e.g., to indicate the RAN node's capabilities or support for neural networks, for example. Thus, the RAN capabilities at 312 may include, for example, neural network support information, e.g., which may include neural network capability information and hardware information for the RAN node. Thus, for example, at 312, the RAN capabilities may include or indicate, by way of example, a list of supported neural network (NN) types, a list of functions (e.g., RAN functions) that can be supported or performed by the RAN node 212 with a neural network, and/or a list of hardware capabilities (e.g., hardware features) of the RAN node.

At 314, controller 210 may send to RAN node 212 a request for (e.g., one or more types of) measurement information, and a request to perform pre-filtering (or selection) or pre-processing on such measurement information before sending the measurement information to the controller 210. RAN node 212 then collects and possibly pre-processes or filters the measurement information or data, e.g., as requested by the controller 210.

At 316, the RAN node 212 then sends to controller 210 the measurement information or requested RAN data (e.g., as requested by the instructions from the controller 210). For example, at 316, the measurement information or RAN data sent to the controller 210 may include, e.g., a list of relevant data elements or metrics and/or measurements for or associated with the RAN node 212 or cell(s) of the RAN node 212 and/or measurements of users/UEs of the cell(s) of the RAN node 212. The data may include, for example, measurement information or data that is periodic (e.g., periodically measured by the RAN node) and/or event-driven data (e.g., data or measurement information that is sent or provided to controller 210 when the data reaches certain threshold(s) or when other events are detected or have occurred). Also, at 316, the RAN node 212 may send controller 210 hardware availability information that indicates an availability of the hardware (e.g., processors or processor cores, memory, . . . ) of the RAN node to be used for neural network processing.

At 318, controller 210 determines a configuration of a neural network for the RAN node 212 (e.g., including selecting a neural network type and determining one or more parameters or settings of the neural network), based on the measurement information or data received from the RAN node 212. Thus, for example, at 318, the controller 210 may make an initial determination, for at least one RAN function, of a type of neural network to use, and a configuration of the neural network (e.g., inputs, output(s), input layers, hidden layers, number of neurons, activation functions, weights, and/or other neural network settings or parameters.

At 320, the controller 210 sends to RAN node 212, neural network configuration information that indicates the configuration of the neural network for the RAN node 212 (e.g., including the neural network type and/or settings or parameters of the neural network).

At 322, the RAN node 212 may send to controller 210 updated measurement information, e.g., as requested by the instructions from the controller 210. For example, at 316, the updated measurement information or RAN data sent to the controller 210 may include, e.g., a list of relevant updated data elements or metrics and/or measurements for or associated with the RAN node 212 or cell(s) of the RAN node 212 and/or updated measurements of users/UEs of the cell(s) of the RAN node 212. The data may include, for example, measurement information or data that is periodic (e.g., periodically measured by the RAN node) and/or event-driven data (e.g., data or measurement information that is sent or provided to controller 210 when the data reaches certain threshold(s) or when other events are detected or have occurred). Also, at 322, the RAN node 212 may send controller 210 updated hardware availability information that indicates an updated availability of the hardware (e.g., processors or processor cores, memory, . . . ) of the RAN node to be used for neural network processing.

At 324, controller 210 may determine an updated (or adjusted) neural network configuration (e.g., which may include an updated neural network type and/or one or more adjusted or updated neural network settings or parameters), e.g., based on the updated or changed measurement information, data or hardware availability information. For example, updated or changed measurement information (e.g., which may include or may be based on updated signal measurements related to the cell(s) of the RAN node 212 or signal measurements associated with UEs of the cells of RAN node 212) may cause the controller to adjust or change one or more parameters or settings of the neural network(s) of the RAN node 212. Likewise, for example, hardware resources at the RAN node 212 available for neural network processing may be significantly less than before, e.g., thus causing the controller 210 to change or adjust settings or parameters (e.g., to use fewer neurons or layers) of a neural network at the RAN node 212, or possibly to cancel the use of such neural network at the RAN node.

At 326, the controller 210 sends to RAN node 212, updated or adjusted neural network configuration information that indicates the updated or adjusted configuration of the neural network for the RAN node 212 (e.g., including the updated or adjusted neural network type and/or the updated or adjusted settings or parameters of the neural network for the RAN node 212).

Figure 4:
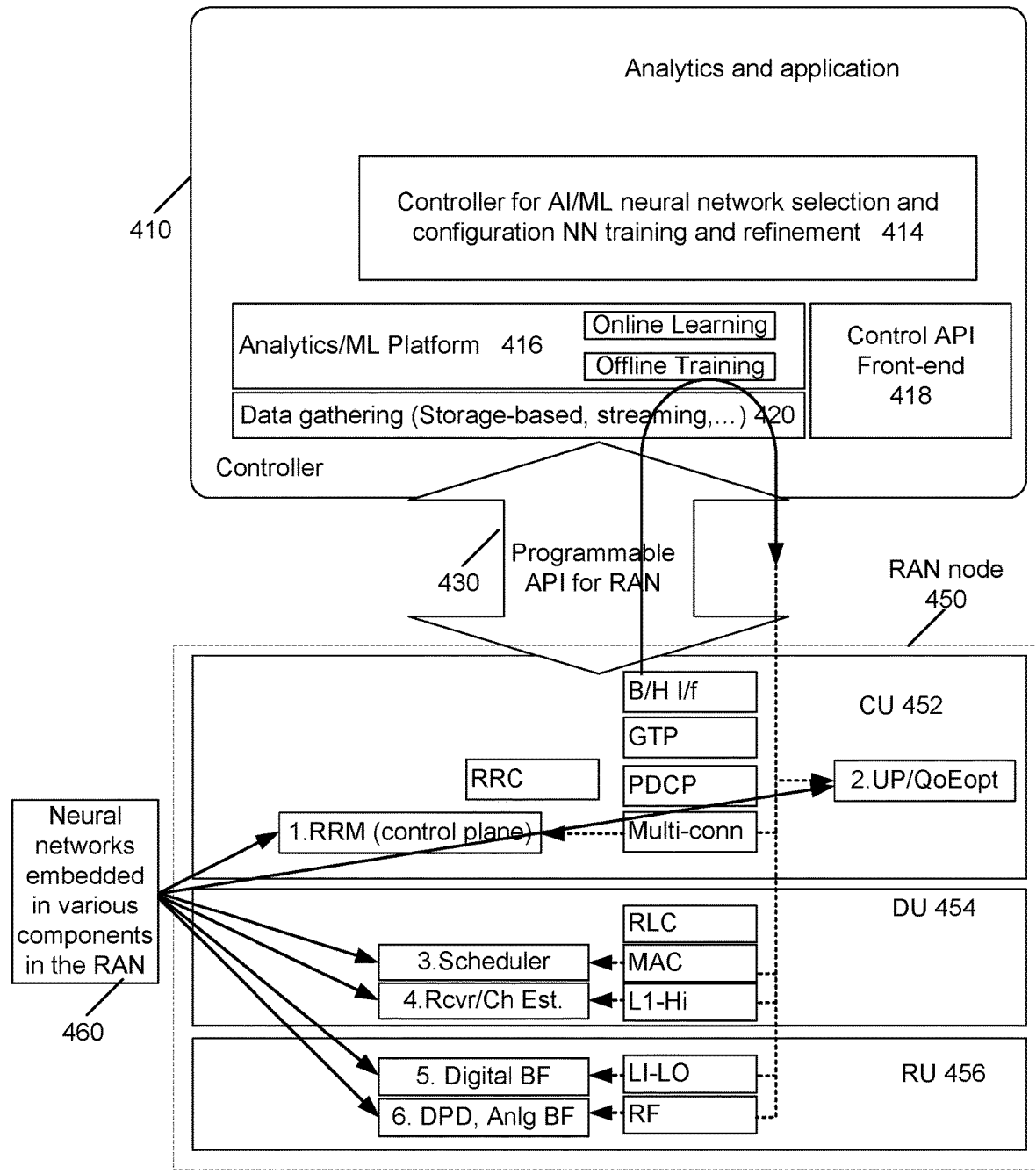
FIG. 4 is a diagram of a system, including a controller and a radio access network (RAN) node, according to another example embodiment.

FIG. 4 is a diagram of a system, including a controller and a RAN node, according to another example embodiment. A controller 410 is in communication via a programmable API 430 with a RAN node 450. Controller 410 may include a controller application and analytics to support AI neural network training and learning. Thus, controller 410 may include a controller 414 for AI neural network selection and neural network configuration of one or more parameters or settings. Controller 410 may also perform neural network training and refinement. An analytics and machine learning platform 416 may include offline training and/or online learning. An API frontend 418 may terminate (i.e., including sending and/or receiving of messages) and handles appropriate encoding/decoding of messages over the API. A data gathering block 420 is provided, to gather and store this data. Data gathering block may receive and store (and/or forwards/routes) data received over the API. The controller 210 may interface to many RAN nodes, and in an example implementation, the data gathering block 20 may provide a scalable way to handle potentially large amounts of data coming from many RAN nodes, for example.

An illustrative example of a RAN node 450 is shown in FIG. 4. RAN node 450 may include three blocks (e.g., the functions of a RAN node may be divided into multiple blocks), including a central unit (CU) 452, a distributed unit (DU) 454, and a radio unit (RU) 456. The CU 452 is a logical node that includes the gNB (BS) functions, such as transfer of user data, mobility control, radio access network sharing, positioning, session management, etc., except those functions allocated exclusively to the DU/RU. A CU controls the operation of one or more DUs over a front-haul interface, and may include one or more higher level functions or protocol entities such as RRC (radio resource control), B/H 1/f (back-haul interface), GTP (GPRS tunneling protocol), PDCP (packet data convergence protocol), and multiple connectivity. The DU 454 is a logical node that includes a subset of the gNB functions, depending on the functional split option, and may include protocol entities such as RLC (radio link control), MAC (media access control) and L1/PHY-High (part of the PHY layer). The RU is also a logical node, and provides some of the lower level gNB functions, such as PHY (lower L1) and radio frequency (RF) functions. In an example embodiment, the central unit (CU) 452 may be provided at one location or node and is connected to a core network, while a DU/RU pair may be provided at different geographic locations to provide wireless coverage to UEs at different locations. The CU is connected to (and controls) multiple DUs/RUs (DU/RU pairs). A RAN node may include any or even all of the blocks or functions shown for a CU, DU, and/or RU.

According to an example embodiment, FIG. 2 illustrates an example RAN node 212 in which many or most (or even all) of the RAN functions are provided on a single RAN node, whereas FIG. 4 shows another example embodiment of a RAN node in which RAN functions may be divided between multiple (e.g., two) nodes, e.g., between a CU 452, and a DU (or including a DU/RU pair 454, 456), as an example. These are merely example RAN nodes, and other RAN node configurations may be used. The specific allocation of protocol entities and/or functions between CU, DU and RU may vary. FIG. 4 is only an illustrative example, and other divisions or allocations between RAN blocks or RAN components may be used.

According to example embodiments, an AI neural network may be provided on a card or board, within a module, or on a semiconductor chip, and may use a processor(s) or processor core (s) or co-processor units and/or may use a dedicated hardware accelerator on the RAN node. A neural network may also use memory for storing weights and biases and other parameters as well as input data and intermediate calculations. A neural network may use interfaces between a processor and a memory or peripheral devices or hardware accelerators in order to effect movement of data so as to perform its calculations.

Further examples and illustrative example details will now be described with reference to aspects A-F, e.g., with respect to FIGS. 2 and/or 4.

Further details of Aspect A: RAN node (e.g., 450, FIG. 4, as an illustrative example, or 212 in FIG. 2 as another illustrative example) capable of executing a neural network for some RAN functions. RAN Node may be eNB (4G/LTE) or gNB (5G) (as illustrative examples), or other wireless network technology RAN node. The RAN node may be able to use a neural-network-based execution of one or more RAN functions, including functions within various modules or blocks in the RAN, with a neural network embedded in the RAN. Thus, at 460 (FIG. 4), one or more neural networks may be embedded (or provided within or for) the CU 452, DU 454 and/or the RU 456, e.g., to perform various RAN functions or operations, as shown in FIG. 4. Thus, for example, as shown in FIG. 4, neural networks may be embedded or provided for one or more of the following RAN functions (by way of illustrative example):

1) CU: Control-plane functions: e.g., RRM (radio resource management) algorithms such as Carrier Aggregation (secondary cell (Scell) selection for addition/deletion), Dual Connectivity SeNB/SCG (secondary gNG/eNB/BS or secondary cell) selection, Load-balancing (intra-frequency or inter-frequency), Admission Control, DRX (discontinuous reception) setting, UE connection release, etc.

2) CU: User-plane or Quality of Experience (QoE) functions: Identification of flows such as video streaming/gaming etc., buffer sizing/packet dropping, etc.

3) DU: Scheduler: Massive MIMO (multiple input, multiple output) beam selection, etc., data scheduling for uplink or downlink data transmission.

4) DU: Layer-1 (L1 or Physical Layer): Receiver, Channel estimation,

5) RU: Layer 1 (lower PHY): digital beamforming,

6) RU: Layer 1 (lower PHY): digital pre-distortion (DPD), analog beamforming, etc.

Although, separate components or blocks are shown for DU and RU, in some cases, each DU may commonly include both the DU+RU blocks or components. Thus, in such a case, the DU may include any or all of the protocol entities and functions of both DU and RU shown in FIG. 4.

The RAN may be deployed as a Cloud RAN where in "Central Unit" (CU, comprising functions such as Control Plane, User Plane and in general non-real-time functions) may be deployed in a cloud location separated from the Distributed Unit (DU, comprising functions such as Scheduler, MAC, Layer-1, etc.) and a Radio Unit (RU, comprising some functions related to Layer-1 such as Digital Beamforming, Digital Pre-Distortion (DPD) filtering, Analog beamforming, etc.

A RAN node may have certain special hardware capabilities that can assist in execution of the neural networks: e.g., hardware accelerator(s) (which are dedicated hardware that may be used or allocated to perform calculations or functions) for executing certain types of neural networks, and high-speed memory, as some examples. These capabilities may be limited in various ways—e.g., limits on the amount of processing or size of neural networks.

Further details of Aspect B: a controller (e.g., controller 210, FIG. 2, or 410, FIG. 4, as illustrative examples) that supports selection and configuration of one or more neural networks: The Controller 410 may be a radio intelligent controller (RIC), or other controller.

The controller 410 may include, e.g.: An analytics/Machine Learning (ML) or Artificial Intelligence (AI) module 416 or platform that provides facilities to train neural networks; a data gathering module 420 that can receive data provided by multiple RAN nodes; a control API frontend 418 that is able to handle appropriate messaging to or from the RAN node over an API; a module 414 for selecting a type of NN and determining a configuration of NN for various types of RAN node functions, and training the NN using the analytics/Machine Learning module 416. The training may be performed offline, or updated online.

Further details of Aspect C: API 430 between RAN node 450 and Controller 410: The API 430 may include two parts:

1. Controller-to-RAN API: to enable Controller to provide instructions to the RAN such as: Requesting RAN to provide neural network support information, e.g., which may include a list of types of neural networks (NNs) supported by the RAN node, list of RAN functions that use NNs, hardware capability descriptors, etc. Requesting RAN node to provide certain data elements/metrics or other information—in addition, the mode of sending the data/metrics can be indicated: Periodic or event-driven, Streaming mode or batch mode, Real time or non-real-time/delay-tolerant, Instructions to the RAN to pre-process or pre-filter various data elements in programmable manner before sending them to the Controller—this may be provided along with the request for providing data/metrics, and Provide instructions to the RAN based on decisions made by the Controller such as: Indication of selected type of NN for certain types of functions; Configuration of the NN, etc.

2. RAN-to-Controller API: to enable RAN to provide to the controller: A. capabilities of the RAN, such as HW capabilities or the types of neural network (NN) supported or the types of functions for which NN can be used; B. data related to the NN or the operation of the relevant functions, such as metrics or measurements, as requested by the Controller according to the mode (periodic/event-driven, or streaming/batch-mode etc.).

API 430 may be implemented with various protocols, e.g. REST/Netconf. The API 430 (either part 1 or part 2) may be between the Controller 410 and the RAN if the RAN is instantiated as an integrated CU+DU (including CU=DU+RU), or may be further decomposed in the case of a Cloud RAN deployment as APIs between the Controller and the CU as well as Controller and the DU. As noted, the DU may commonly include DU+RU protocol entities and functions.

The controller may provide to RAN node instructions to the RAN to pre-process or pre-filter various data elements or measurement information in programmable manner before sending them to the controller. Examples of Pre-filtering: e.g., for a given type of metric/measurements, only report values if (i) the current value differs from the previous reported value by at least a certain amount; (ii) the current value is higher or lower than a provided threshold, or is within or outside a given range. Examples of pre-processing: for a given type of metric/measurements, perform a provided calculation on the values and report the calculated value. Examples: (i) apply a provided function to each individual value (e.g. square( ), or log( ), or multiply by a factor, or a transform such as Fourier transform etc.) of the metric/ measurements; (ii) apply a provided function to a sequence of values of the metric (e.g., calculate statistical measures such as simple moving average, or standard deviation, or exponential moving average); (iii) a combination of multiple calculations: e.g., apply a provided function to each individual value, then calculate a function or statistical measure to a sequence of values of the provided function, etc. Pre-processing and pre-filtering can be applied in conjunction or together—e.g., values of a given metric are first pre-processed by applying provided functions or statistical measures, followed by applying pre-filtering conditions to determine whether the values should be reported etc.

The controller can request RAN node to provide certain data elements/metrics—in addition, the mode of sending a given data element/metric/measurement can be indicated: Periodic or event-driven. In periodic mode, the RAN node will report the values of the data/metric/measurement at a provided period. In event-driven mode, the RAN node will only report the value if a certain event has happened. The event may be associated with the value of the measurement (e.g., the value becoming higher or lower than a threshold) or may be tied to the occurrence of some other event (e.g., a RRC procedure completion, etc.). Streaming mode (data sent continuously as soon as it is available) or batch mode (wait to accumulate a batch of data before sending), etc. In streaming mode, values of a particular data element/metric are sent continuously as soon as it is available. The RAN node can decide how much data to accumulate based on the amount of buffering it can handle. The RAN node may apply batching to each individual type of data element or metric, or to a collection of metrics. Real-time or non-real-time/ delay-tolerant: Real-time data needs to be sent within a certain specified delay, otherwise dropped (along with indication of drop).

In some conditions, the RAN may be unable to provide the data requested by the Controller at the desired periodicity or real-time, due to hardware limitations or processing/ memory constraints or backhaul bandwidth. In this case the RAN can indicate to the controller that data cannot be provided due to such constraints. In response, the Controller may provide pre-processing/pre-filtering instructions to the RAN that will effectively reduce the amount of data that the RAN needs to report, and thus ease the reporting burden on the RAN. This may result in some loss of fidelity/granularity in the reported data, leading to tradeoff between the performance that the Controller can achieve vs the data-reporting burden on the RAN.

Further details of Aspect D: Information provided by RAN Node to Controller.

RAN node may provide to the Controller over the API (e.g., one or more of): 1) A list of supported types of neural networks whose execution is supported by the RAN node. This may include: Feed-forward neural networks, recurrent neural networks, deep neural networks, convolutional neural networks, Q-networks, Deep-Q networks, Gated Recurrent Units, Long/Short-Term Memory networks, Boltzmann machines, Restricted Boltzmann Machines, or other types of neural networks, or combinations thereof such as modular neural networks. This may further include parameters for each type of neural networks, such as: limit on the number of layers, or number of neurons, or type of activation functions supported, or type of output layer operations (softmax, or others); 2) A list of RAN functions for which it can execute a neural network to make decisions. This may include: Control-plane functions: e.g., RRM algorithms such as Carrier Aggregation (Scell selection for addition/dele- tion), Dual Connectivity SeNB/SCG selection, Load-balancing (intra-frequency or inter-frequency), Admission Control, DRX setting, UE connection release etc. User-plane functions: Identification of flows such as video streaming/gaming, buffer sizing/dropping, etc. Scheduler: Massive MIMO beam selection, etc. Layer-1 (L1 or Physical Layer): Receiver, channel estimation, digital beamforming, digital pre-distortion, analog beamforming, etc. 3) A list of HW capabilities descriptors describing the HW capabilities of the RAN node for executing neural networks, Limitations on processing or memory, level of precision (e.g., 8-bit integer or 16-bit or 32-bit floating point) supported by the RAN node, type of HW acceleration capability for NNs, available time cycles for executing time-critical tasks based on NN; 4) A list of available inputs at the RAN node that could be used as inputs into the NN. These may include: User-related measurements: RRC measurements such as RSRP/RSRQ, or MAC-level measurements (e.g., timing advance (TA), PHR (power headroom report), fraction of HARQ (Hybrid ARQ) Acknowledgements (ACKs) or negative acknowledgements (NACKs) or PDCCH (physical downlink control channel) errors, or physical layer measurements (CQI (channel quality information) or PMI (precoding matrix indicator) or RI (rank indication) for a UE), or uplink received signal strength (RSSI) or uplink interference, etc.). These may be on one or more carriers or cells.

Further related to Aspect D: On an ongoing or periodic basis, RAN node may provide a list of data elements to the Controller: These may include various metrics or measurements of the cell (e.g., cell load, composite available capacity, volume of incoming traffic, PRB utilization, number of connected or active users) or users in the cells at the RAN node, e.g., RSRP (reference signal received power)/RSRQ (reference signal received quality)/PHR (power headroom report)/CQI (channel quality information)/Timing Advance, etc. These may include various key performance indicators of the RAN, e.g., block error rate, number or fraction of dropped or blocked calls, user-level or cell-level delivered throughput, latency, queue size, queueing delay, etc. The RAN node may first apply pre-processing/pre-filtering steps on the data as indicated by the controller, in order to determine which data is to be reported to the controller.

Further details of Aspect E: Controller making a determination of the NN type, configuration. Controller makes a determination of the following, taking into account the information received from the RAN over the API: Which type of neural network to use for each supported RAN function at the RAN node; and, For each neural network, an initial configuration, or settings or parameters of the NN (e.g., number and type of inputs/outputs, number of neurons, layers, connectivity graph, weights, activation functions, etc.) of the neural network.

Controller may make the determination as follows: Controller maintains a table mapping the types of RAN functions to (a set of allowed types of neural networks for each RAN function, minimum RAN capabilities for each type of neural networks). The table may be configured or programmed at the Controller by the operator based on the guidance from the RAN node manufacturer or other experts. For each type of RAN function, given the data provided by the RAN node on the types of supported neural networks and the limits on RAN node capabilities (e.g., number of neurons or number of layers or activation functions, . . . ). For each function, the Controller can choose an appropriate type of neural network using this table and the information provided by the RAN regarding supported capabilities at the RAN node. Once the type of function is selected, the Controller may decide the initial configuration of the neural network. The configuration (e.g., weights and connectivity graph of NN (neural network)) may be chosen either randomly for initialization, or by training the NN based on an initial training dataset using the capabilities of the Controller for analytics/AI/ML and online/offline training, or based on the information on metrics/measurements received from the RAN.

Additionally Aspect G: Controller making an update of the NN type and configuration: Some example details: For example, on ongoing basis, based on the information received periodically or in batches from the RAN node, the controller may update the configuration (weights/connectivity graph etc.) of the neural network and send the updated configuration to the RAN node. Based on the data elements/metrics/measurements reported by the RAN, the controller can update the training of the neural network. For example, typically the neural network weights may be determined in order to minimize an error between the output predicted by the neural network and the underlying training data or observed data. In some cases the neural network is trained based on the observations of the effect of certain actions on the RAN performance, such as with reinforcement learning where the actual effect on the running system (e.g., changes in throughput, or changes in block error rate) are observed in the running system and the neural network training of weights is updated to reflect the observed.

Figure 5:
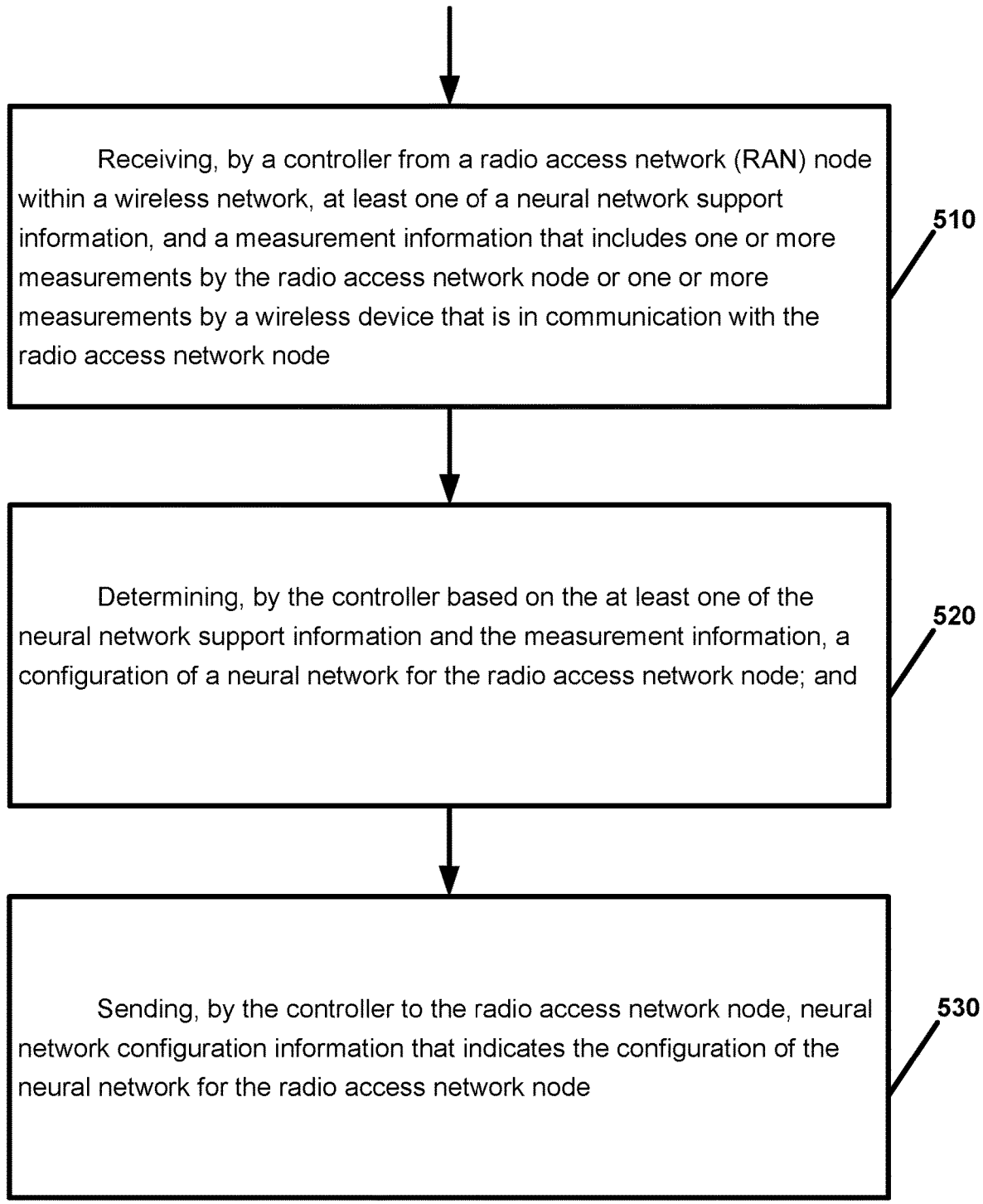
FIG. 5 is a flow chart illustrating operation of a controller according to an example embodiment.

Example 1. FIG. 5 is a flow chart illustrating operation of a controller according to an example embodiment. Operation 510 includes receiving, by a controller from a radio access network (RAN) node within a wireless network, at least one of a neural network support information, and a measurement information that includes one or more measurements by the RAN node or one or more measurements by a wireless device that is in communication with the RAN node. Operation 520 includes determining, by the controller based on the at least one of the neural network support information and the measurement information, a configuration of a neural network for the RAN node. And, operation 530 includes sending, by the controller to the RAN node, neural network configuration information that indicates the configuration of the neural network for the RAN node.

Example 2. The method of example 1: wherein the receiving comprises receiving, by the controller from the radio access network (RAN) node within the wireless network, the neural network support information; and wherein the determining comprises determining, by the controller based on at least a portion of the neural network support information, the configuration of the neural network for the RAN node.

Example 3. The method of any of examples 1-2, wherein the receiving comprises receiving, by the controller from the radio access network (RAN) node within the wireless network, the measurement information; and wherein the determining comprises determining, by the controller based on at least a portion of the measurement information, the configuration of the neural network for the RAN node.

Example 4. The method of any of examples 1-3 wherein the neural network support information comprises at least one of: neural network capability information that indicates capabilities of the RAN node to support one or more different types of neural networks; and hardware information for the RAN node, including at least one of the following: hardware feature information that indicates one or more hardware features of the RAN node; and hardware availability information that indicates an availability of the hardware of the RAN node to support the neural network.

Example 5. The method of example 4 wherein the hardware feature information comprises information that indicates one or more of the following for the RAN node: information describing a number and/or clock speed of processors or processor cores of the RAN node; information describing an amount of memory of the RAN node; and information describing one or more hardware accelerators of the RAN node that may be used for the neural network.

Example 6. The method of any of examples 4-5 wherein the hardware availability information comprises information that indicates one or more of the following for the RAN node: an amount or percentage of processor resources of the RAN node that is available for the neural network; an amount or percentage of processor resources of the RAN node that is used or occupied, and unavailable for the neural network; an amount or percentage of memory of the RAN node that is available for the neural network; an amount or percentage of memory of the RAN node that is used or occupied, and unavailable for the neural network; an amount or percentage of hardware accelerator resources of the RAN node that are available for the neural network, for one or more hardware accelerators of the RAN node; and an amount or percentage of hardware accelerator resources of the RAN node that are used or occupied, and unavailable for the neural network, for one or more hardware accelerators of the RAN node.

Example 7. The method of any of examples 1-6, wherein the determining comprises: determining, by the controller based on the neural network support information and the measurement information, a configuration of a neural network for the RAN node.

Example 8. The method of any of examples 1-7 further comprising: sending, by the controller to the RAN node, information indicating at least one of a processing or pre-filtering that should be performed by the RAN node on the hardware availability information and/or the measurement information before the RAN node sends to the controller the hardware availability information and/or the measurement information.

Example 9. The method of any of examples 1-8, wherein the determining comprises: determining a neural network type that is supported by the RAN node for the RAN function; determining one or more attributes or parameters for the neural network.

Example 10. The method of any of examples 1-9, wherein the neural network capability information indicates capabilities of the RAN node to support one or more different types of neural networks for each of one or more RAN functions of the RAN node; wherein the determining comprises: determining, for each of the one or more RAN functions of the RAN node based on at least the neural network capability information, a neural network type that is supported by the RAN node for the RAN function.

Example 11. The method of any of examples 1-10, further comprising: sending, by the controller to the RAN node, information indicating at least one type of the hardware availability information and/or at least one type of measurement information that should be provided by the RAN node to the controller.

Example 12. The method of any of examples 1-11, further comprising: sending, by the controller to the RAN node, information indicating at least one of a processing or filtering that should be performed by the RAN node on the hardware availability information and/or the measurement information before the RAN node sends to the controller the hardware availability information and/or the measurement information.

Example 13. The method of any of examples 1-12, further comprising: sending, by the controller to the RAN node, information indicating a format of at least one of the hardware availability information and the measurement information to be reported or provided by the RAN node to the controller.

Example 14. An apparatus comprising means for performing the method of any of examples 1-13.

Example 15. A non-transitory computer-readable storage medium comprising instructions stored thereon that, when executed by at least one processor, are configured to cause a computing system to perform the method of any of examples 1-13.

Example 16. An apparatus comprising: at least one processor; and at least one memory including computer program code; the at least one memory and the computer program code configured to, with the at least one processor, cause the apparatus at least to perform the method of any of examples 1-13.

Example 17. An apparatus comprising: at least one processor; and at least one memory including computer program code; the at least one memory and the computer program code configured to, with the at least one processor, cause the apparatus at least to: receive, by a controller from a radio access network (RAN) node within a wireless network, at least one of a neural network support information, and a measurement information that includes one or more measurements by the RAN node or one or more measurements by a wireless device that is in communication with the RAN node; determining, by the controller based on the at least one of the neural network support information and the measurement information, a configuration of a neural network for the RAN node; and sending, by the controller to the RAN node, neural network configuration information that indicates the configuration of the neural network for the RAN node.

Example 18. The apparatus of example 17: wherein causing the apparatus to receive comprises causing the apparatus to receive, by the controller from the radio access network (RAN) node within the wireless network, the neural network support information; and wherein causing the apparatus to determine comprises causing the apparatus to determine, by the controller based on at least a portion of the neural network support information, the configuration of the neural network for the RAN node.

Example 19. The apparatus of any of examples 17-18: wherein causing the apparatus to receive comprises causing the apparatus to receive, by the controller from the radio access network (RAN) node within the wireless network, the measurement information; and wherein causing the apparatus to determine comprises causing the apparatus the determining comprises determining, by the controller based on at least a portion of the measurement information, the configuration of the neural network for the RAN node.

Example 20. The apparatus of any of examples 17-19 wherein the neural network support information comprises at least one of: neural network capability information that indicates capabilities of the RAN node to support one or more different types of neural networks; and hardware information for the RAN node, including at least one of the following: hardware feature information that indicates one or more hardware features of the RAN node; and hardware availability information that indicates an availability of the hardware of the RAN node to support the neural network.

Example 21. The apparatus of example 20 wherein the hardware feature information comprises information that indicates one or more of the following for the RAN node: information describing a number and/or clock speed of processors or processor cores of the RAN node; information describing an amount of memory of the RAN node; and information describing one or more hardware accelerators of the RAN node that may be used for the neural network.

Example 22. The apparatus of any of examples 20-21 wherein the hardware availability information comprises information that indicates one or more of the following for the RAN node: an amount or percentage of processor resources of the RAN node that is available for the neural network; an amount or percentage of processor resources of the RAN node that is used or occupied, and unavailable for the neural network; an amount or percentage of memory of the RAN node that is available for the neural network; an amount or percentage of memory of the RAN node that is used or occupied, and unavailable for the neural network; an amount or percentage of hardware accelerator resources of the RAN node that are available for the neural network, for one or more hardware accelerators of the RAN node; and an amount or percentage of hardware accelerator resources of the RAN node that are used or occupied, and unavailable for the neural network, for one or more hardware accelerators of the RAN node.

Example 23. The apparatus of any of examples 17-22, wherein causing the apparatus to determine comprises causing the apparatus to: determining, by the controller based on the neural network support information and the measurement information, a configuration of a neural network for the RAN node.

Example 24. The apparatus of any of examples 17-23 further causing the apparatus to: send, by the controller to the RAN node, information indicating at least one of a processing or pre-filtering that should be performed by the RAN node on the hardware availability information and/or the measurement information before the RAN node sends to the controller the hardware availability information and/or the measurement information.

Example 25. The apparatus of any of examples 17-24, wherein causing the apparatus to determine comprises causing the apparatus to: determine a neural network type that is supported by the RAN node for the RAN function; determine one or more attributes or parameters for the neural network.

Example 26. The apparatus of any of examples 17-25, wherein the neural network capability information indicates capabilities of the RAN node to support one or more different types of neural networks for each of one or more RAN functions of the RAN node; wherein causing the apparatus to determine comprises causing the apparatus to: determine, for each of the one or more RAN functions of the RAN node based on at least the neural network capability information, a neural network type that is supported by the RAN node for the RAN function.

Example 27. The apparatus of any of examples 17-26, further comprising causing the apparatus to: send, by the controller to the RAN node, information indicating at least one type of the hardware availability information and/or at least one type of measurement information that should be provided by the RAN node to the controller.

Example 28. The apparatus of any of examples 17-27, further comprising causing the apparatus to: send, by the controller to the RAN node, information indicating at least one of a processing or filtering that should be performed by the RAN node on the hardware availability information and/or the measurement information before the RAN node sends to the controller the hardware availability information and/or the measurement information.

Figure 6:
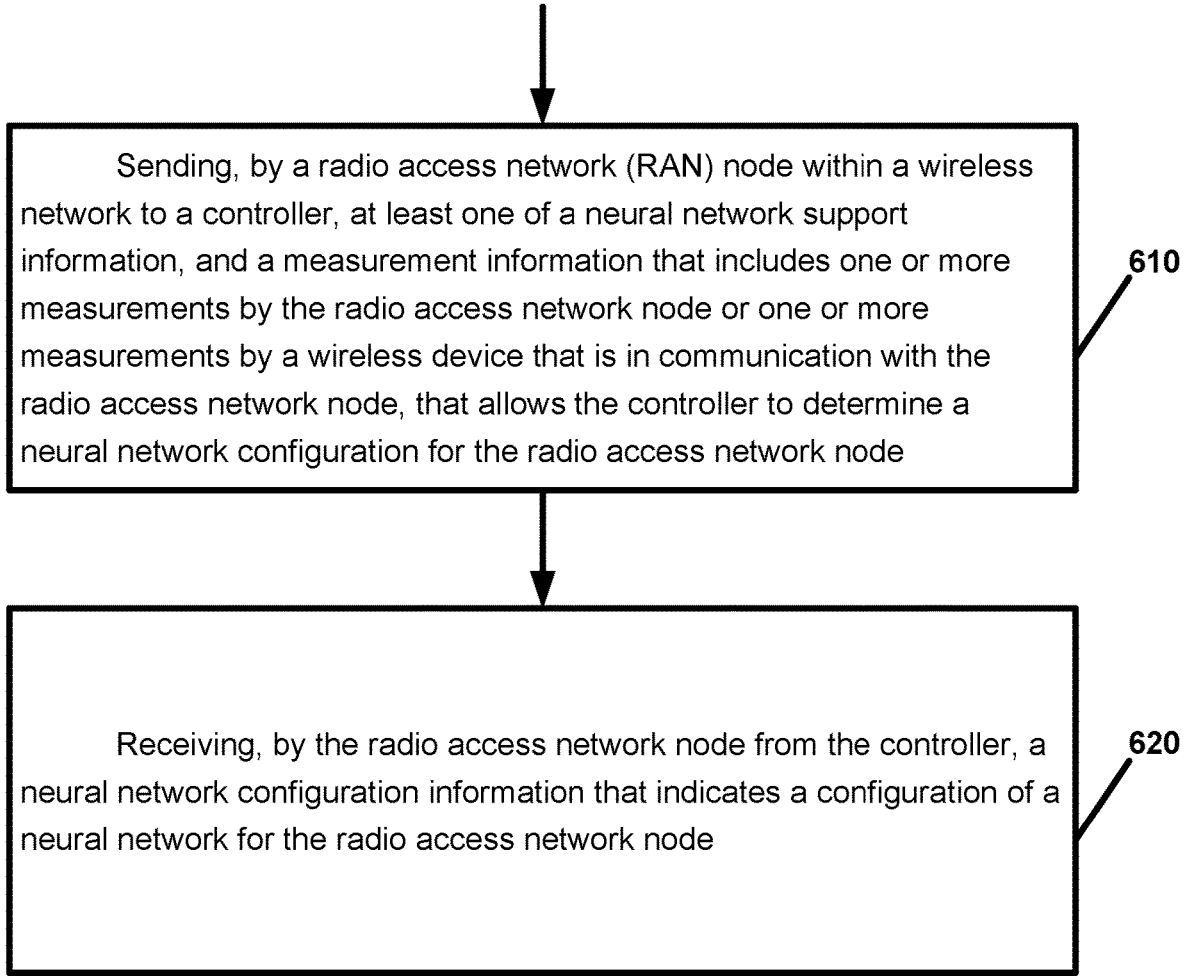
FIG. 6 is a flow chart illustrating operation of a radio access network (RAN) node according to an example embodiment.

Example 29. FIG. 6 is a flow chart illustrating operation of a RAN node according to an example embodiment. Operation 610 includes sending, by a radio access network (RAN) node within a wireless network to a controller, at least one of a neural network support information, and a measurement information that includes one or more measurements by the RAN node or one or more measurements by a wireless device that is in communication with the RAN node, that allows the controller to determine a neural network configuration for the RAN node. And, operation 620 includes receiving, by the RAN node from the controller, a neural network configuration information that indicates a configuration of a neural network for the RAN node.

Example 30. The method of example 29, wherein the sending comprises: sending, by the radio access network (RAN) node within the wireless network to the controller, at least the neural network support information, that allows the controller to determine a neural network configuration for the RAN node.

Example 31. The method of any of examples 29-30, wherein the sending comprises: sending, by the radio access network (RAN) node within the wireless network to the controller, at least the one or more measurements by the RAN node or one or more measurements by a wireless device that is in communication with the RAN node, that allows the controller to determine a neural network configuration for the RAN node.

Example 32. The method of any of examples 29-31 and further comprising: configuring, by the RAN node, a neural network based on the neural network configuration information; and performing, by the RAN node, one or more RAN functions based at least in part on the configured neural network.

Example 33. The method of any of examples 29-32 wherein the neural network support information comprises at least one of: neural network capability information that indicates capabilities of the RAN node to support one or more different types of neural networks; and hardware information for the RAN node, including at least one of the following: hardware feature information that indicates one or more hardware features of the RAN node; and hardware availability information that indicates an availability of the hardware of the RAN node to support the neural network.

Example 34. The method of example 33 wherein the hardware feature information comprises information that indicates one or more of the following for the RAN node: information describing a number and/or clock speed of processors or processor cores of the RAN node; information describing an amount of memory of the RAN node; and information describing one or more hardware accelerators of the RAN node that may be used for the neural network.

Example 35. The method of any of examples 33-34 wherein the hardware availability information comprises information that indicates one or more of the following for the RAN node: an amount or percentage of processor resources of the RAN node that is available for the neural network; an amount or percentage of processor resources of the RAN node that is used or occupied, and unavailable for the neural network; an amount or percentage of memory of the RAN node that is available for the neural network; an amount or percentage of memory of the RAN node that is used or occupied, and unavailable for the neural network; an amount or percentage of hardware accelerator resources of the RAN node that are available for the neural network, for one or more hardware accelerators of the RAN node; and an amount or percentage of hardware accelerator resources of the RAN node that are used or occupied, and unavailable for the neural network, for one or more hardware accelerators of the RAN node.

Example 36. The method of any of examples 33-35, and further comprising: sending, by the RAN node to the controller, measurement information that includes one or more measurements by the RAN node or one or more measurements by a user device connected to the RAN node; wherein the neural network configuration is based on the neural network support information and the measurement information.

Example 37. The method of any of examples 33-36, wherein the neural network capability information indicates capabilities of the RAN node to support one or more different types of neural networks for each of one or more RAN functions of the RAN node.

Example 38. The method of any of examples 33-37, further comprising: receiving, by the RAN node from the controller, information indicating at least one type of the hardware availability information and/or at least one type of measurement information that should be provided by the RAN node to the controller.

Example 39. The method of any of examples 33-38, further comprising: receiving, by the RAN node from the controller, information indicating at least one of a processing or filtering that should be performed by the RAN node on the hardware availability information and/or the measurement information before the RAN node sends to the controller the hardware availability information and/or the measurement information.

Example 40. The method of any of examples 33-39, further comprising: receiving, by the RAN node from the controller, information indicating a format of at least one of the hardware availability information and the measurement information to be reported or provided by the RAN node to the controller.

Example 41. An apparatus comprising means for performing the method of any of examples 29-39.

Example 42. A non-transitory computer-readable storage medium comprising instructions stored thereon that, when executed by at least one processor, are configured to cause a computing system to perform the method of any of examples 29-39.

Example 43. An apparatus comprising: at least one processor; and at least one memory including computer program code; the at least one memory and the computer program code configured to, with the at least one processor, cause the apparatus at least to perform the method of any of examples 29-39.

Example 44. An apparatus comprising: at least one processor; and at least one memory including computer program code; the at least one memory and the computer program code configured to, with the at least one processor, cause the apparatus to: send, by a radio access network (RAN) node within a wireless network to a controller, at least one of a neural network support information, and a measurement information that includes one or more measurements by the RAN node or one or more measurements by a wireless device that is in communication with the RAN node, that allows the controller to determine a neural network configuration for the RAN node; and receive, by the RAN node from the controller, a neural network configuration information that indicates a configuration of a neural network for the RAN node.

Example 45. The apparatus of example 44, wherein causing the apparatus to send comprises causing the apparatus to: send, by the radio access network (RAN) node within the wireless network to the controller, at least the neural network support information, that allows the controller to determine a neural network configuration for the RAN node.

Example 46. The apparatus of any of examples 44-45, wherein the causing the apparatus to send comprises causing the apparatus to: send, by the radio access network (RAN) node within the wireless network to the controller, at least the one or more measurements by the RAN node or one or more measurements by a wireless device that is in communication with the RAN node, that allows the controller to determine a neural network configuration for the RAN node.

Example 47. The apparatus of any of examples 44-46 and further causing the apparatus to: configure, by the RAN node, a neural network based on the neural network configuration information; and perform, by the RAN node, one or more RAN functions based at least in part on the configured neural network.

Example 48. The apparatus of any of examples 44-47 wherein the neural network support information comprises at least one of: neural network capability information that indicates capabilities of the RAN node to support one or more different types of neural networks; and hardware information for the RAN node, including at least one of the following: hardware feature information that indicates one or more hardware features of the RAN node; and hardware availability information that indicates an availability of the hardware of the RAN node to support the neural network.

Example 49. The apparatus of example 48 wherein the hardware feature information comprises information that indicates one or more of the following for the RAN node: information describing a number and/or clock speed of processors or processor cores of the RAN node; information describing an amount of memory of the RAN node; and information describing one or more hardware accelerators of the RAN node that may be used for the neural network.

Example 50. The apparatus of any of examples 48-49 wherein the hardware availability information comprises information that indicates one or more of the following for the RAN node: an amount or percentage of processor resources of the RAN node that is available for the neural network; an amount or percentage of processor resources of the RAN node that is used or occupied, and unavailable for the neural network; an amount or percentage of memory of the RAN node that is available for the neural network; an amount or percentage of memory of the RAN node that is used or occupied, and unavailable for the neural network; an amount or percentage of hardware accelerator resources of the RAN node that are available for the neural network, for one or more hardware accelerators of the RAN node; and an amount or percentage of hardware accelerator resources of the RAN node that are used or occupied, and unavailable for the neural network, for one or more hardware accelerators of the RAN node.

Example 51: The apparatus of any of examples 48-50, and further causing the apparatus to: send, by the RAN node to the controller, measurement information that includes one or more measurements by the RAN node or one or more measurements by a user device connected to the RAN node; and wherein the neural network configuration is based on the neural network support information and the measurement information.

Example 52. The apparatus of any of examples 48-51, wherein the neural network capability information indicates capabilities of the RAN node to support one or more different types of neural networks for each of one or more RAN functions of the RAN node.

Example 53. The apparatus of any of examples 48-52, further causing the apparatus to: receive, by the RAN node from the controller, information indicating at least one type of the hardware availability information and/or at least one type of measurement information that should be provided by the RAN node to the controller.

Example 54. The apparatus of any of examples 48-53, further causing the apparatus to: receive, by the RAN node from the controller, information indicating at least one of a processing or filtering that should be performed by the RAN node on the hardware availability information and/or the measurement information before the RAN node sends to the controller the hardware availability information and/or the measurement information.

Example 55. The apparatus of any of examples 48-54, further causing the apparatus to: receive, by the RAN node from the controller, information indicating a format of at least one of the hardware availability information and the measurement information to be reported or provided by the RAN node to the controller.

Figure 7:
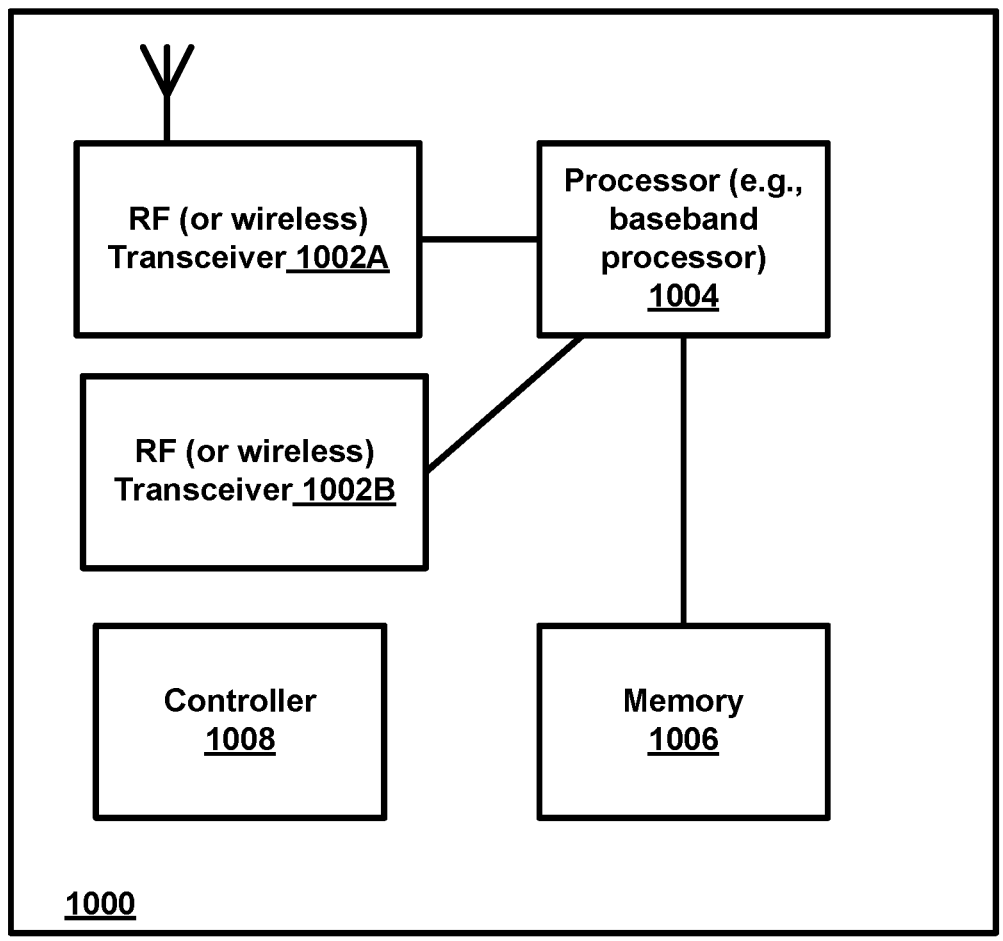
FIG. 7 is a block diagram of a wireless station (e.g., AP, BS, RAN node, UE or user device, or other network node) according to an example embodiment.

FIG. 7 is a block diagram of a wireless station (e.g., AP, BS or user device, or other network node) 1000 according to an example embodiment. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 7, a controller (or processor) 1008 may execute software and instructions, and may provide overall control for the station 1000, and may provide control for other systems not shown in FIG. 7, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
  receiving, by a controller within a wireless network from a radio access network node that includes a neural network, the neural network support information that indicates the radio access network node's capabilities or support for neural networks, wherein the neural network support information comprises at least one of:
    neural network capability information that indicates at least capabilities of the radio access network node to support one or more different types of neural networks;
    a list of one or more radio access network functions for which the neural network may be used by the radio access network node to perform at least a portion of the radio access network function; or
    hardware availability information that indicates an availability of hardware of the radio access network node to support the neural network;
  determining, by the controller based on the neural network support information, a configuration of the neural network included in the radio access network node, wherein the configuration of the neural network includes at least one of a neural network type or one or more attributes or parameters to be used for the neural network included in the radio access network node; and
  sending, by the controller to the radio access network node, neural network configuration information that indicates the configuration to be used for the neural network included in the radio access network node.

2. The method of claim 1, wherein the hardware availability information comprises information that indicates one or more of the following for the radio access network node:
  an amount or percentage of processor resources of the radio access network node that is available for the neural network;
  an amount or percentage of processor resources of the radio access network node that is used or occupied, and unavailable for the neural network;
  an amount or percentage of memory of the radio access network node that is available for the neural network;
  an amount or percentage of memory of the radio access network node that is used or occupied, and unavailable for the neural network;
  an amount or percentage of hardware accelerator resources of the radio access network node that are available for the neural network, for one or more hardware accelerators of the radio access network node; and
  an amount or percentage of hardware accelerator resources of the radio access network node that are used or occupied, and unavailable for the neural network, for one or more hardware accelerators of the radio access network node.

3. A non-transitory computer-readable storage medium comprising instructions stored thereon that, when executed by at least one processor, are configured to cause a controller to perform the method of claim 1.

4. A controller comprising:
  at least one processor; and
  at least one memory including computer program code;
  the at least one memory and the computer program code configured to, with the at least one processor, cause the controller at least to:
    receive, by the controller within a wireless network from a radio access network (RAN) node that includes a neural network, the neural network support information that indicates the radio access network node's capabilities or support for neural networks, wherein the neural network support information comprises at least one of:
    neural network capability information that indicates at least capabilities of the radio access network node to support one or more different types of neural networks;
    a list of one or more radio access network functions for which the neural network may be used by the radio access network node to perform at least a portion of the radio access network function; or
    hardware availability information that indicates an availability of hardware of the radio access network node to support the neural network;
    determine, by the controller based on the neural network support information, a configuration of the neural network included in the radio access network node, wherein the configuration of the neural network includes at least one of a neural network type or one or more attributes or parameters to be used for the neural network included in the radio access network node; and
    send, by the controller to the radio access network node, neural network configuration information that indicates the configuration to be used for the neural network included in the radio access network node.

5. The controller of claim 4, wherein the hardware availability information comprises information that indicates one or more of the following for the radio access network node:
  an amount or percentage of processor resources of the radio access network node that is available for the neural network;
  an amount or percentage of processor resources of the radio access network node that is used or occupied, and unavailable for the neural network;
  an amount or percentage of memory of the radio access network node that is available for the neural network;
  an amount or percentage of memory of the radio access network node that is used or occupied, and unavailable for the neural network;
  an amount or percentage of hardware accelerator resources of the radio access network node that are available for the neural network, for one or more hardware accelerators of the radio access network node; and an amount or percentage of hardware accelerator resources of the radio access network node that are used or occupied, and unavailable for the neural network, for one or more hardware accelerators of the radio access network node.

6. The controller of claim 4, further causing the controller to:

send, by the controller to the radio access network node, information indicating at least one of a processing or pre-filtering that should be performed by the radio access network node on the hardware availability information before the radio access network node sends to the controller the hardware availability information.

7. The controller of claim 4, wherein the neural network capability information indicates capabilities of the radio access network node to support one or more different types of neural networks for each of one or more radio access network functions of the radio access network node;

wherein causing the controller to determine comprises causing the apparatus to:

determine, for each of the one or more radio access network functions of the radio access network node based on at least the neural network capability information, a neural network type that is supported by the radio access network node for the radio access network function.

8. The controller of claim 4, further comprising causing the controller to:

send, by the controller to the radio access network node, information indicating at least one type of the hardware availability information that should be provided by the radio access network node to the controller.

9. The controller of claim 4, further comprising causing the controller to:

send, by the controller to the radio access network node, information indicating at least one of a processing or filtering that should be performed by the radio access network node on the hardware availability information before the radio access network node sends to the controller the hardware availability information.

10. A method comprising:

sending, by a radio access network (RAN) node that includes a neural network to a controller within a wireless network, the neural network support information that indicates the radio access network node's capabilities or support for neural networks, wherein the neural network support information comprises at least one of:

neural network capability information that indicates at least capabilities of the radio access network node to support one or more different types of neural networks;

a list of one or more radio access network functions for which the neural network may be used by the radio access network node to perform at least a portion of the radio access network function; or hardware availability information that indicates an availability of hardware of the radio access network node to support the neural network; and receiving, by the radio access network node from the controller, a neural network configuration information that indicates a configuration to be used for the neural network included in the radio access network node, wherein the configuration includes at least one of a neural network type or one or more attributes or parameters to be used for the neural network included in the radio access network node.

11. A non-transitory computer-readable storage medium comprising instructions stored thereon that, when executed by at least one processor, are configured to cause the radio access network node to perform the method of claim 10.

12. A radio access network (RAN) node comprising:

at least one processor; and at least one memory including computer program code;

the at least one memory and the computer program code configured to, with the at least one processor, cause the apparatus to:

send, by the radio access network node that includes a neural network to a controller within a wireless network, the neural network support information that indicates the radio access network node's capabilities or support for neural networks, wherein the neural network support information comprises at least one of:

neural network capability information that indicates at least capabilities of the radio access network node to support one or more different types of neural networks;

a list of one or more radio access network functions for which the neural network may be used by the radio access network node to perform at least a portion of the radio access network function; or hardware availability information that indicates an availability of hardware of the radio access network node to support the neural network; and receive, by the radio access network node from the controller, a neural network configuration information that indicates a configuration to be used for the neural network included in the radio access network node, wherein the configuration includes at least one of a neural network type or one or more attributes or parameters to be used for the neural network included in the radio access network node.

13. The radio access network node of claim 12 and further causing the radio access network node to:

configure, by the radio access network node, the neural network included in the radio access network node based on the neural network configuration information; and perform, by the radio access network node, one or more radio access network functions based at least in part on the configured neural network.

14. The radio access network node of claim 12 wherein the hardware availability information comprises information that indicates one or more of the following for the radio access network node:

an amount or percentage of processor resources of the radio access network node that is available for the neural network;

an amount or percentage of processor resources of the radio access network node that is used or occupied, and unavailable for the neural network;

an amount or percentage of memory of the radio access network node that is available for the neural network;

an amount or percentage of memory of the radio access network node that is used or occupied, and unavailable for the neural network;

an amount or percentage of hardware accelerator resources of the radio access network node that are available for the neural network, for one or more hardware accelerators of the radio access network node; and an amount or percentage of hardware accelerator resources of the radio access network node that are used or occupied, and unavailable for the neural network, for one or more hardware accelerators of the radio access network node.

15. The radio access network node of claim 12, further causing the radio access network node to:
receive, by the radio access network node from the controller, information indicating at least one type of the hardware availability information that should be provided by the radio access network node to the controller.

16. The radio access network node of claim 12, further causing the radio access network node to:
receive, by the radio access network node from the controller, information indicating at least one of a processing or filtering that should be performed by the radio access network node on the hardware availability information before the radio access network node sends to the controller the hardware availability information.

17. The radio access network node of claim 12, further causing the radio access network node to:
receive, by the radio access network node from the controller, information indicating a format of at least one of the hardware availability information to be reported or provided by the radio access network node to the controller.

* * * * *